Jan. 11, 1938.   C. M. DOLBY   2,105,282
VALVE
Filed Oct. 4, 1937
Fig.1.
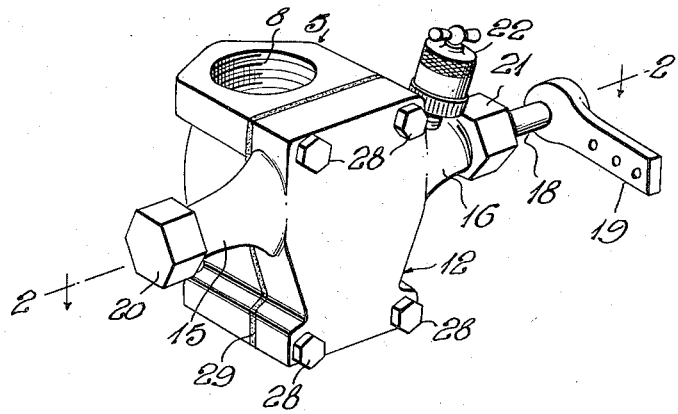
Fig.2.
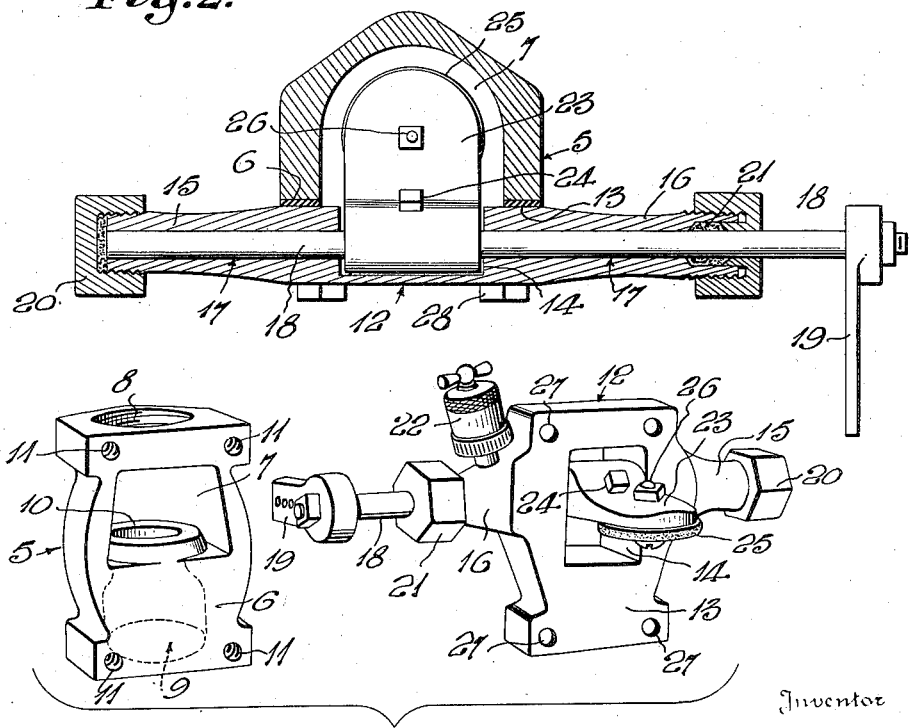
Fig.3.
Inventor
Charles M. Dolby
By H. A. Willson &co
Attorneys Patented Jan. 11, 1938

2,105,282

UNITED STATES PATENT OFFICE 2,105,282

VALVE

Charles M. Dolby, Lawrenceville, Ill.

Application October 4, 1937, Serial No. 167,288

1 Claim. (Cl. 251—10)

The invention relates to valves of the general type having a rock shaft, an arm secured to said rock shaft, and a valve secured to said arm for cooperation with a valve seat, and while it is intended primarily for actuation by a gasometer to control the feeding of natural or manufactured gas to a gas engine, it is usable also for various other purposes.

The principal object of the invention is to provide a simple, inexpensive and generally improved construction in which the seat and the pipe connections are carried by one block, and in which the rock shaft, arm and valve are carried by a second block detachably secured to said one block. Thus, upon release of the securing means, said second block and the parts carried thereby are removable as a single unit from said one block without disturbing the pipe connections, both the valve and the seat being readily accessible for making repairs or for replacement when said second block is removed.

A further object is to provide a valve of such simple construction that it may be inexpensively manufactured and marketed, the construction, however, being such as to be long-lived, efficient and in every way desirable.

With the foregoing in view, the invention resides in the novel subject matter hereinafter described and claimed, description being accomplished by reference to the accompanying drawing.

Fig. 1 is a perspective view of the complete valve.

Fig. 2 is a horizontal sectional view as indicated by line 2—2 of Fig. 1.

Fig. 3 is a disassembled perspective view.

A preferred construction has been shown and will be specifically described, with the understanding however, that within the scope of the invention as claimed, variations may be made.

The numeral 5 on the drawing denotes a one-piece metal block having a flat side 6 and a recess 7 opening through said flat side, the ends of said block being provided with threaded openings 8 and 9 for engagement with pipes. One wall of the recess 7 is at right angles to the axes of these openings and is provided with a valve seat 10 surrounding one of said openings. At suitable points, the block 5 is provided with threaded openings 11 for a purpose to appear.

A second block 12 is provided, preferably in the nature of a thick plate, said block 12 having a flat side 13 and a recess 14 opening through said flat side. The block 12 in the present disclosure, is formed with two integral outwardly projecting bearing necks 15 and 16 having axially alined bearing openings 17, the axes of which are parallel with the flat face 13. A rock shaft 18 is mounted in the bearing openings 17 and projects beyond the neck 16 for connection with suitable operating means, a portion of which is shown at 19. The outer end of the neck 15 is provided with a threaded cap 20 to be filled with lubricant, and the outer end of the neck 16 is equipped with a stuffing box 21. This neck 16 is also preferably provided with a grease cup or the like 22, for purposes of lubrication.

The rock shaft 18 extends across the recess 14 and an arm 23 is secured to the recess-spanning portion of said rock shaft, a set screw 24 being preferably employed in securing said arm to said rock shaft. This arm projects out of the recess 14 and beyond the side 13 of the block 12, and its projecting end is provided with a valve 25. This valve is preferably in the form of a disk of leather, rubber or any other suitable material, detachably secured to the arm 23 by means of a bolt or the like 26.

The block 12 is provided with openings 27 for alinement with the openings 11 of the block 5, cap screws 28 being passed through these openings 27 and threaded into said openings 11 to detachably secure said block 12 to said block 5 with the flat faces 6 and 13 of the two blocks in abutting relation. A suitable gasket 29 is, of course, provided between these two flat faces.

With the two blocks secured in assembled relation, the arm 23 projects into the recess 7 of the block 5 and the valve 25 is in cooperable relation with the seat 10, the valve being opened and closed as required, by rocking the shaft 18. Due to the facilities for lubrication, there is no danger of the valve sticking, and the lubricant also prevents corrosion.

Whenever repairs are necessary, for instance, grinding of the seat 10 or replacement of the valve 25, the cap screws 28 are removed, whereupon the block 12 and all parts carried thereby are bodily removable as a single unit from the block 5, leaving the latter connected to the pipes. With the two blocks thus disconnected from each other, both the valve and the seat are readily accessible for inspection, repair, replacement or the like.

From the foregoing, taken in connection with the accompanying drawing, it will be seen that I have made novel provision for carrying out the objects of the invention, and while the details disclosed are preferred, variations may be made within the scope of the invention as claimed.

I claim:

A valve comprising an elongated block having its ends shaped for engagement with a wrench, said block having a flat longitudinal side, a recess opening through said flat side, and alined threaded pipe-receiving openings in the block ends communicating with the ends of said recess, one end wall of said recess being relatively distant from the corresponding end of the block and being provided with a valve seat around one of said openings; a second elongated and plate-like block having a flat longitudinal side, a relatively small recess opening through said flat side, and integral outwardly projecting alined tubular bearing necks at opposite sides of said recess, a cap threaded on the outer end of one of said necks, a stuffing box threaded on the outer end of the other of said necks; a rock shaft permanently mounted in said tubular necks and projecting beyond said stuffing box, an arm having one end secured to said rock shaft within said recess of said second block, said arm projecting permanently from this recess beyond said flat side of said second block and having a valve on its projecting end; and means detachably securing said second block to the first mentioned block with the flat sides of the two blocks in abutting relation; said arm extending into said recess of said first mentioned block and having its valve disposed in this recess in operative relation with said valve seat.

CHARLES M. DOLBY.